United States Patent [19]

Chou

[11] Patent Number: 4,635,902

[45] Date of Patent: Jan. 13, 1987

[54] JACK SAFETY DEVICE

[76] Inventor: Peter Chou, 41, Lane 50, Sy Kung Kuoh, Chung Pu Hsiang, Chiayi Hsien, Taiwan

[21] Appl. No.: 733,503

[22] Filed: May 13, 1985

[51] Int. Cl.⁴ ............................................ B60P 1/48

[52] U.S. Cl. ............................................ 254/8 B

[58] Field of Search ..................... 254/2 B, 8 B, 93 H, 254/124; 74/535; 248/354.5, 407, 408

[56] References Cited

U.S. PATENT DOCUMENTS

| | | | |
|---|---|---|---|
| 2,611,579 | 9/1952 | Guzey et al. | 254/8 B |
| 2,845,992 | 8/1958 | Cramer | 248/408 |
| 2,909,212 | 10/1959 | Scherer | 248/408 |
| 3,047,269 | 7/1962 | Renshaw | 254/93 H |
| 3,195,860 | 7/1965 | Simms | 254/2 B |
| 3,647,183 | 3/1972 | Rishovd | 254/2 B |
| 4,251,056 | 2/1981 | Maniglia | 254/8 B |

*Primary Examiner*—Robert C. Watson

*Attorney, Agent, or Firm*—Browdy and Neimark

[57] ABSTRACT

Jack safety device, having a rotation key integral with a pressing spring, a hollow-set key lid, and a spanner fitting the spanner onto a hydraulic tank incorporating a camming bearing surface on the spanner so as to move the key into grooves on the hydraulic jack stem in one position of the spanner and lift the key out of the grooves in another position of the spanner.

3 Claims, 9 Drawing Figures

JACK SAFETY DEVICE

BACKGROUND OF THE INVENTION

The present invention relates to a jack safety device.

A previous device provides one set of elastic stop-rotation keys engageable with a coupling groove provided above a hydraulically driven central stem shaft. Such a unit serves to prevent the operator from being injured by a heavy load that would drop down due to sudden retraction of the hydraulic stem shaft in case of failure or malfunctioning of the jack. In addition, the previous art provides one set of braking wires comprising braking wire, a pressing spring, a hollow-set key lid, an axis of the braking wire, plus two screw nails in addition to a spanner provided on a propelling stem, in order that it may rise up by a backpull of a stop-rotation key in case of a depressurization taking place, such that the hydraulically driven stem shaft may disengage and move back into the hydraulic tank. In addition, the previous art further incorporates a push block whose top accommodates a projecting rod attached by a retraction spring interconnecting another projecting rod attached to the tail end of the hydraulic tank so that the hydraulically driven stem shaft will be bound to be pulled back by a spring when it moves to retreat into the hydraulic tank.

The arrangement to provide for a correlated engagement between the stop-rotation key and coupling groove on the hydraulic stem shaft, as taught in the previous art, has surely the advantage of preventing sudden, unexpected falling of a load borne by the jack due to sudden or unexpected failure, and consequently retraction, of the stem shaft, thereby achieving better protection of the operator at work. Yet it has to be pointed out, as it has been noted by experience, that the axis of the braking wire employed in the previous art will and can wear out to rupture after prolonged service by pulling or dragging, just like what would happen to the braking wire of a bicycle or like vehicles upon prolonged and protracted service, that which would in all likelihood result in rupture and consequently failure of braking action. The same situation applies easily to the previous art of the device; in addition, as a spanner was fitted onto the propelling stem according to the previous art, the propelling stem was in turn locked to the machine bed at a slope of 60 degrees, which as such occupies some space and therefore will cause inconvenience in the shipping or handling practice.

SUMMARY OF THE INVENTION

So it would be much appreciated to provide for a means that permits movable installation of the propelling stem so that the stem can somehow fold up in a retracted state to save space when it is not in use. Also it would be no less appreciated to safeguard against the possibility of the occurrence of a braking failure or rupture of the braking wire by making it feasible to render unnecessary to use an axis of the braking wire.

In view of the disadvantages found with the use of the jack safety device structured according to a previous improvement disclosed hereinbefore, the inventor started to work for further improvements, and eventually with success made the present invention.

Accordingly, the primary object of the present invention is to simplify the construction of the braking wire assembly of previous arts by the removal of the braking wire and the axis thereof without prejudicing the prevention of faulty braking action or rupture of the braking wire, that is the positive safeguarding feature of such a device.

A further objective of the present invention is to provide such a simplified braking wire assembly which makes possible the disengagement of the hydraulic stem shaft for retreating back to the hydraulic tank by virtue of a lifting of the stop-rotation key by activation of the spanner located on the hydraulic tank.

A further objective of the present invention is to provide a movably mountable and dismountable propelling stem which permits fold-up disassemblage when not in use so as to achieve saving of space and convenience of handling during shipping as well.

BRIEF DESCRIPTION OF THE DRAWINGS

Other features and advantages of the present invention will emerge from the following descriptions of embodiments given by way of illustration but not in any way limiting, with reference to the accompanying drawing in which.

DETAILED DESCRIPTION OF THE PREFERRED EMBODIMENT

Figure 1:
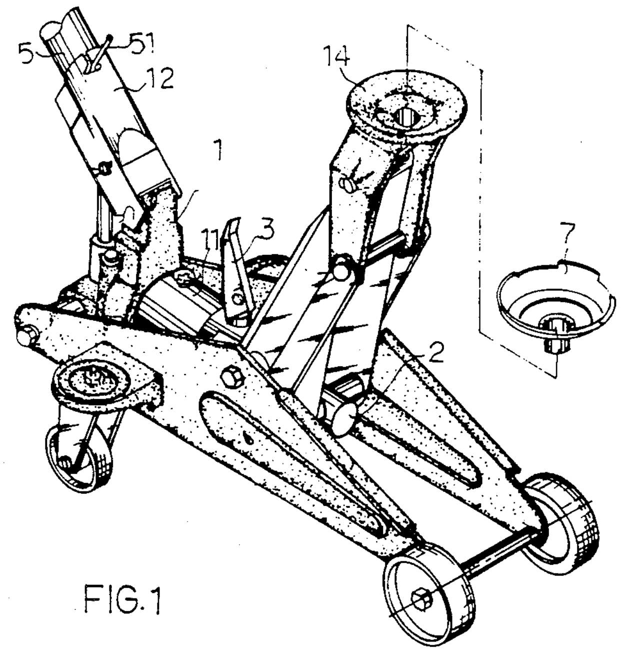
FIG. 1 is a general perspective view of an improved jack safety device of the present invention.
Figure 2:
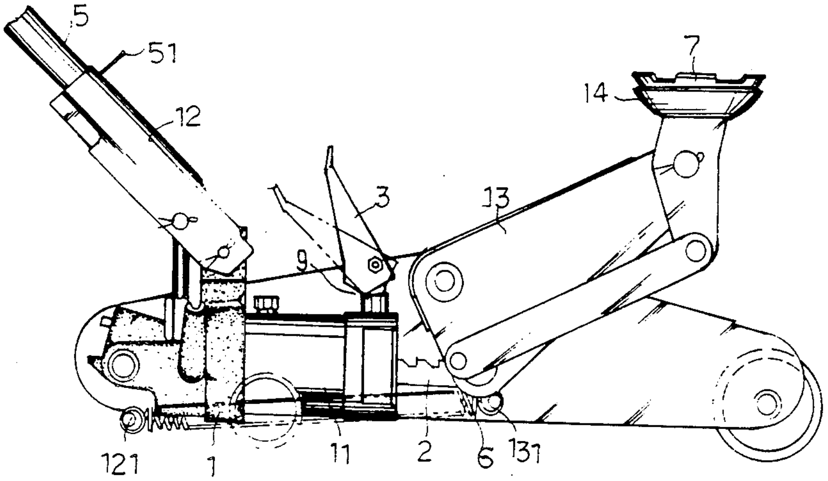
FIG. 2 is a side view of the improved jack safety device of FIG. 1.
Figure 4:
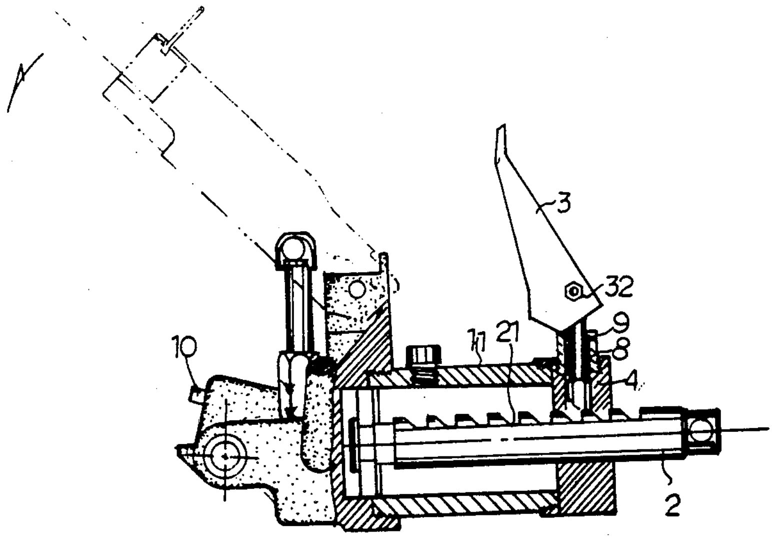
FIG. 4 is an illustration of the invention device at work.

Referring first to FIGS. 1, 2, and 4, it will be seen that the invention incorporates essentially a braking assembly above the front side of hydraulic tank 11 inside jack 1, said assembly made for engaging one of the coupling grooves 21 that form the upper face of hydraulic stem shaft 2 in hydraulic tank 11, thereby forming an interchecking relationship. The structure and operation logic are given hereinafter. It has to be noted that by virtue of the letting loose or else pressure imposed on spanner 3 located on the hydraulic tank, the braking assembly achieves lowering or else lifting of the stop-rotation key 4 therein, whereupon hydraulic stem shaft 2 is engaged or else forced back into the hydraulic tank.

The propelling stem 5 provided for the invention is of a removable type in place of that stem fitted to the rear side of the jack 1 by screws, so that troubles involved in the handling, shipping or production procedure can be removed once and for all on all occasions. More specifically, propelling stem 5 is engaged into a hole in tail stem 12 at the backside of jack 1 by means of projecting pin 51 thereon so as to facilitate assembling or disassembling operations.

Other parts of the invention somewhat different from those of the prior art, have some similarities in their principle of operation. Still, it deserves mentioning that according to the present invention a bearer block is omitted, and tension spring 6 shortened and hung straddling projecting stem 121 at the bottom of the tail end of jack 1 on the one end, and over projecting stem 131 on the bottom of rock arm 13 on the other end. By this structure, it is possible to pull the extended hydraulic stem shaft 2 back into hydraulic tank 11 by means of tension spring 6. In addition, the load bearer 14 is round instead of being a quadrilateral as was the case taught by the previous art. Also, in the bearer 14 it is permissible to set a claw 7 to facilitate the loading of irregularly shaped objects.

Figure 3:
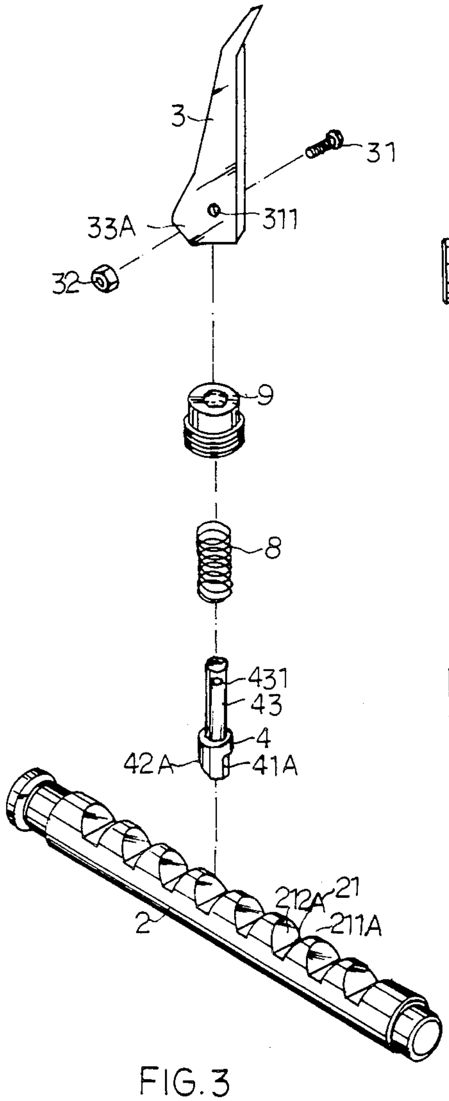
FIG. 3 is a break-away structural perspective of the braking wire assembly as related to the spanner covered hereunder.

Referring to FIG. 3, it will be seen that the upper side along the horizontal length of hydraulic stem shaft 2 is cut into a plurality of engaging grooves 21 each having an upright catching face 211A facing a gliding face 212A on the opposite side. They are complemented by a stop-rotation key 4 complete with correspondingly provided engaging cant 41A and gliding front 42A on the backside. On key shaft 43, there is provided a hole 431. The stop-rotation key 4 and pressing spring 8 are fitted into hollow-set key lid 9 and key shaft 43 extends through spring 8 and lid 9 and is pivotally fixed by means of a screw 31 passing through a small hole 311 provided in spanner 3 by penetration across hole 431 provided on key shaft 42 with key shaft 42 extending between sides of spanner 3 to align with hole 311, so as to permit locking for security by screw nut 32 outside and on the other side of hole 311. An acting edge 33A on the spanner functions as a bearing point such that by letting loose of the spanner 3 when the hydraulic stem shaft 2 is set to engagement or in another case, by bringing pressure to bear upon the spanner 3 to pitch down backward when the hydraulic stem shaft 2 is set free, results in a bearing action by the acting edge 33A. Then the stop-rotation key 4 will lift up and refrain from falling down.

Referring again to FIG. 4, it will be seen that in this illustration showing the invention in its working condition, it is obvious that omission has been made of a bearer block incorporated according to prior art. The stop-rotation key 4 and pressing spring 8 are confined in hollow-set key lid 9, key lid 9 being locked into the screw holes in the hydraulic tank 11 by an interacting tooth, characterized in that stop-rotation key 4, acted upon by the retraction of pressing spring 8, bears down against the upper side of stem shaft 2. Should the stem shaft 2 continue to move ahead then the stop-rotation key 4 will fall and catch into coupling groove 21 thereby blocking further retreat of stem shaft 2. Where it is desired to lift up the stop-rotation key 4, exert pressure on spanner 3 and stop-rotation key 4 will lift up accordingly. Now by loosening adjusting screw 10 of the relief valve, stem shaft 2 will be brought back into hydraulic tank 11 owing to the retraction tension of spring 6.

Figure 5A:
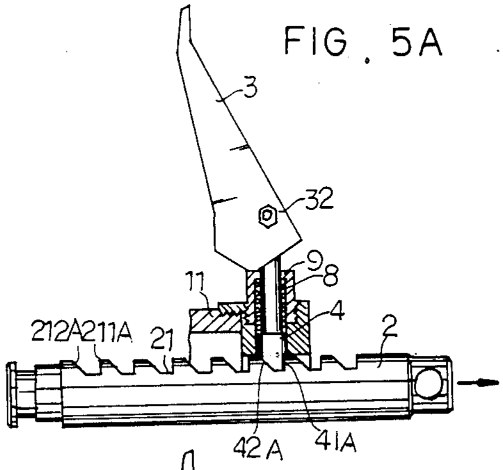
FIGS. 5(A) (B) (C) illustrate three correlated operation steps of the invention hereunder.
Figure 5B:
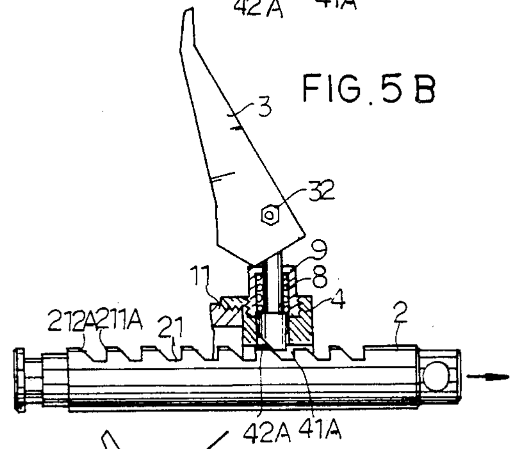
Figure 5C:
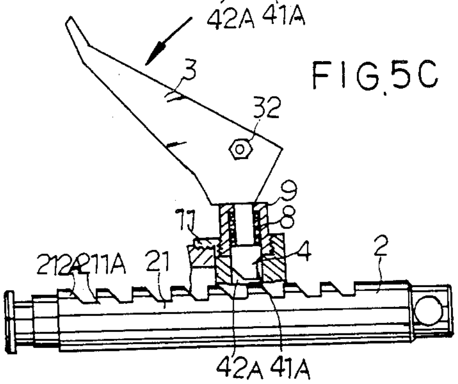

Referring to FIG. 5A, it will be seen that as long as stop-rotation key 4 is engaged with coupling groove 21 to result in an interlocking coupling by the engaging cant 41A with interacting fact 211A, stem shaft 2 will not retreat into hydraulic tank 11 in the event of an emergency or in case it fails to exert the bearing action for any reason whatever. Should further pressure be exerted to hydraulic stem shaft 2, this will result in a push-sliding effect for gliding front 42A on the part of the stop-rotation key 4 in relation to the gliding face 212A on the part of the stem shaft 2, so that the stop rotation key 4 is driven to lift up, only to wind up falling into an adjacent coupling groove 21, is shown in FIG. 5B. When it is desired to decrease the pressure so as to bring stem shaft 2 back into the hydraulic tank 11, spanner 3 is depressed so as to pull up the stop rotation key 4 by the bearing force charged by means of the cant face 32A. With both set free of engagement, stem shaft 2 is moved back into the hydraulic tank, as shown in FIG. 5C.

Figure 6A:
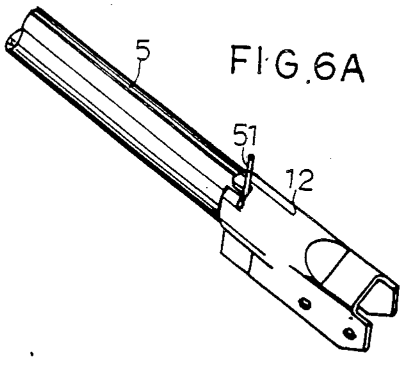
FIG. 6(A) is an illustration of the propelling stem being assembled hereunder.
Figure 6B:
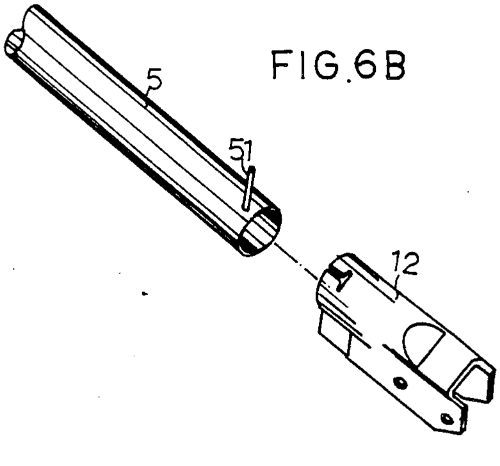
FIG. 6(B) is an illustration of the propelling stem being disassembled hereunder.

Referring to FIG. 6A, it is seen that in this illustration a spanner can be fitted to hydraulic tank 11 instead of merely a propelling stem 5 by itself as was the case with previous arts. With an omission of a braking wire, the propelling stem provided for in the invention can be movably fitted and dismounted with ease without having to have it fixed and locked to the tail end of the jack by means of screws. Essentially it is secured in position to accommodate exertion in operation by having a projecting pin 51 in front thereof fitted into a pin hole slot provided in the tail stem 12 of the jack, such that when it is desired to remove propelling stem 5 from tail stem 12, just projecting pin 51 is moved out along the slot in stem 12 in the manner as shown in FIG. 6B.

The disclosure should appear sufficient to illustrate a simple construction of the invention which provides a jack safety device which provides reliable and comprehensive protection and safety for the operator by the prevention of braking failure or rupture of a braking wire that would likely happen in prior art conventional like devices upon reaching certain years of operation.

I claim:

1. A safety device on a jack which has a hydraulic cylinder and a hydraulic stem shaft extending into the hydraulic cylinder, the safety device comprising:
   - coupling grooves provided in a row on a horizontal length of the hydraulic stem shaft extending into the hydraulic cylinder;
   - a hollow set key lid mounted on a hole forming an entrance to the hydraulic stem shaft in the hydraulic cylinder;
   - a spanner positioned on said hollow set key lid and having a bearing surface in camming contact with said hollow set key lid;
   - a stop rotation key having one end for abutting in said coupling grooves and another end for pivotal attachment to said spanner
   - a spring positioned with said hollow set key lid to oppose a withdrawal action of said stop rotation key from said coupling grooves;
   - said stop rotation key and said spanner connected eccentrically relative to said bearing surface camming contact to cause a lifting of said stop rotation key out of said grooves upon movement of the opposite end of said spanner from the connection to said key in a direction towards the hydraulic cylinder and a movement of said key into said grooves under action of said spring upon release of said opposite end of said spanner in a direction away from the hydraulic cylinder; and
   - a propelling stem shaft demountably connected to said spanner and said key with a quick pin sliding in a groove connect and disconnect structure.

2. The safety device of claim 1 further comprising said stop rotation key having a sloped upright engaging face on one side and a gliding cant on the other side on the end for engaging in said coupling grooves.

3. The safety device of claim 1 further comprising said bearing surface of said spanner including two sloping surfaces meeting at a line and positioned with a one of said sloping surfaces farthest from the said pivotal connection of said key and said spanner in contact with said lid when said key is disengaged from said coupling grooves.

* * * * *